United States Patent Office 2,943,652
Patented July 5, 1960

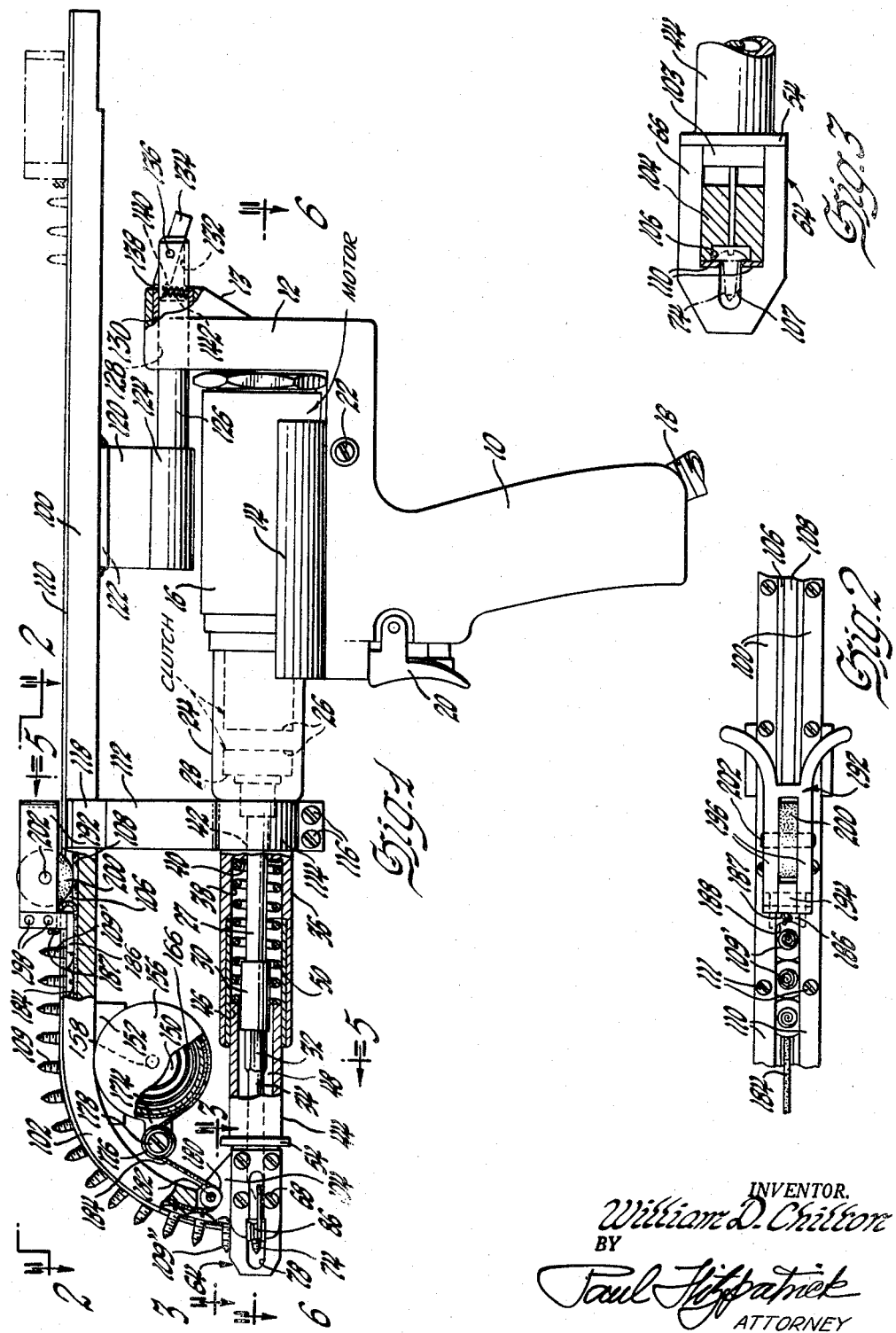

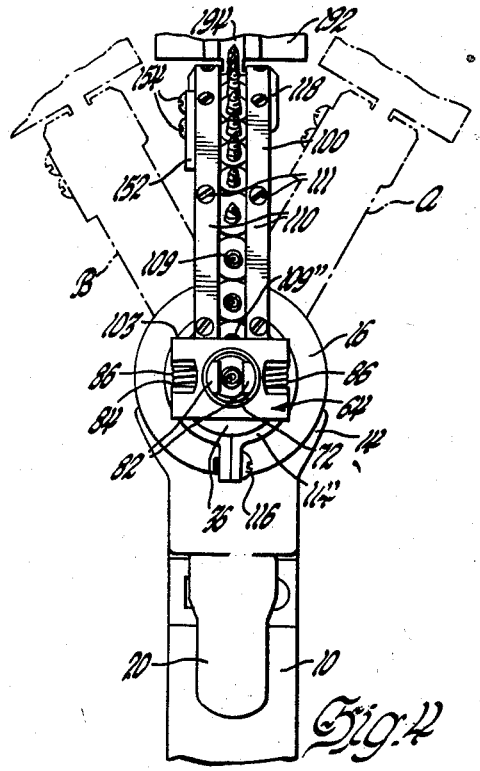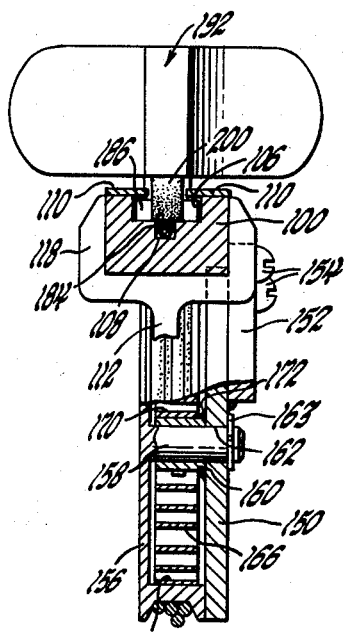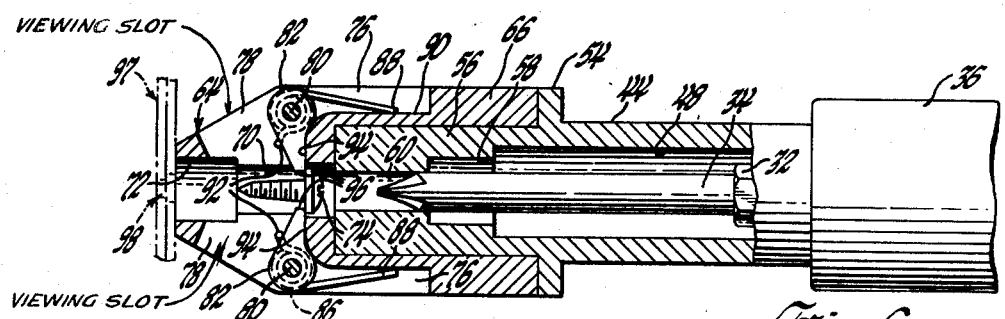

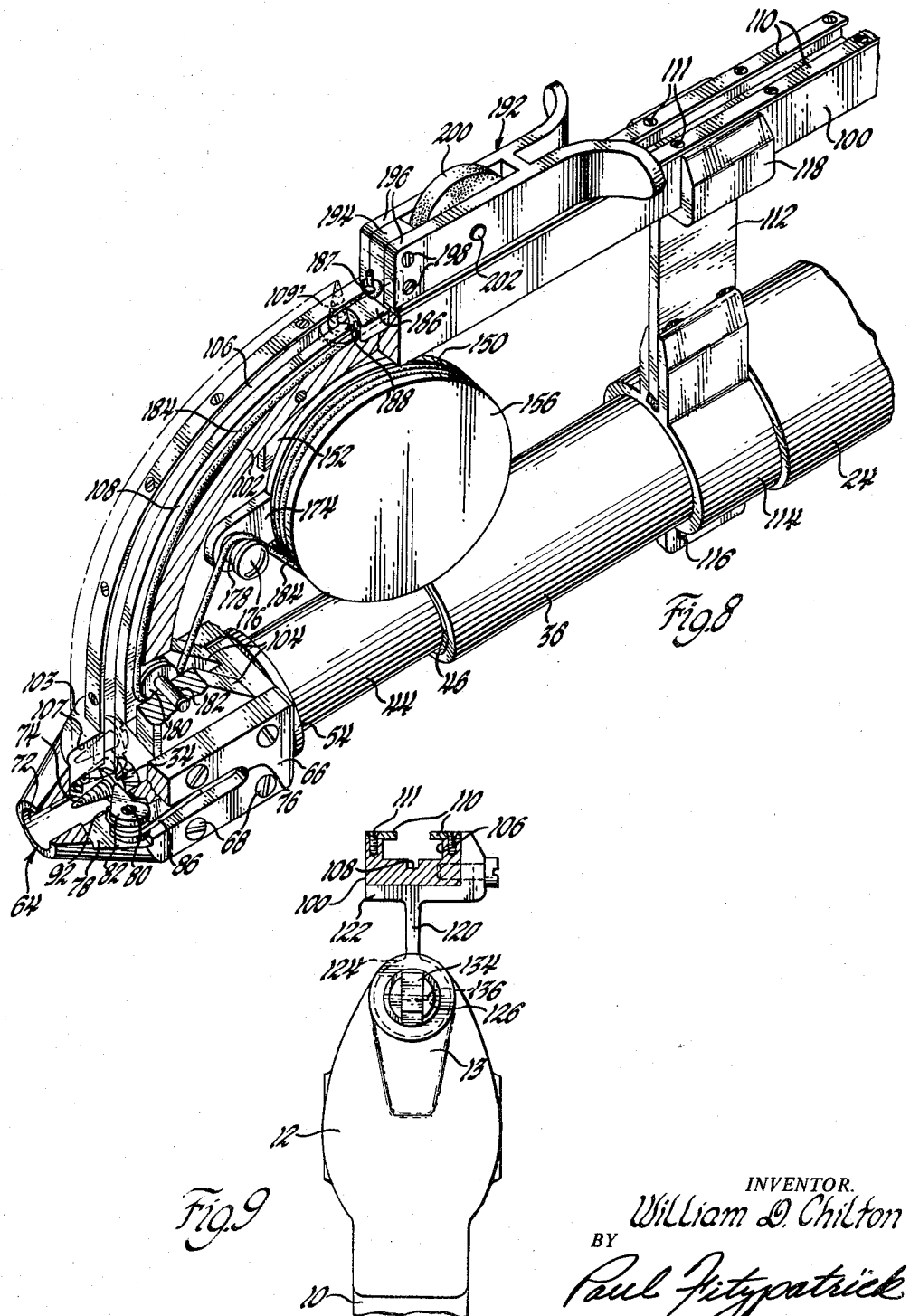

2,943,652
POWER OPERATED TOOL FOR FEEDING AND DRIVING HEADED FASTENERS

William D. Chilton, Royal Oak, Mich., assignor to General Motors Corporation, Detroit, Mich., a corporation of Delaware Filed Dec. 6, 1955, Serial No. 551,394

8 Claims. (Cl. 144—32)

This invention relates to power operated tools for feeding and driving work elements and more particularly to a power operated screw driver for feeding and driving screw elements.

Many present power operated screw drivers depend on a gravity feed of the screw elements. This necessarily limits the usefulness of the screw driver since it can only be used in a few positions rather than in any and all positions required to drive a screw element into a work piece. Many of these screw drivers also do not allow the operator to sight the screw receiving recess in the work piece once the screw driver has been positioned in place preparatory to driving the screw element. Thus, the operator must estimate the desired position of the screw driver on the work piece without assurance that the shank of the screw is accurately aligned with the screw receiving recess.

The power operated screw driver of this invenion, in its preferred embodiment, includes an improved magazine assembly which positively and successively feeds screw elements into position in alignment with the end of the driver element and holds the screw elements in this position so as to be operatively engaged by the driver element regardless of the position of the screw driver. The screw driver also includes an improved manner of sighting for the operator to enable him to accurately position the screw driver with respect to the work piece so that the screw element to be driven will be aligned with the screw receiving recess in the work piece. Thus, the power operated screw driver of this invention overcomes many disadvantages of present screw drivers and can be used in many varied and different environments and positions.

An object of this invention is to provide a new and improved power operated screw driver for feeding and driving screw elements which can be used in any position. Another object of this invention is to provide a power operated screw driver having an improved magazine assembly for positively and successively feeding screw elements into position so as to be driven regardless of the position of the screw driver. A further object of this invention is to provide an improved power operated screw driver having a magazine assembly which positively and successively feeds screw elements into position so as to be driven and holds the screw elements in position regardless of the position of the screw driver. Yet another object of this invention is to provide power operated screw drivers having an improved manner of sighting for the operator to enable him to accurately position the screw driver with respect to the work piece.

These and other objects of this invention will be readily apparent from the following specification and drawings, in which:

Figure 1 is a side elevational view of a power operated screw driver according to this invention, with parts being broken away for clarity of illustration;

Figure 2 is a top plan view of a portion of Figure 1 taken on the plane indicated by line 2—2;

Figure 3 is a sectional view on the plane indicated by line 3—3 of Figure 1;

Figure 4 is a front elevational view of the power operated screw driver;

Figure 5 is a sectional view taken on the plane indicated by line 5—5 of Figure 1, with parts broken away for clarity of illustration;

Figure 6 is a sectional view taken on the plane indicated by line 6—6 of Figure 1 showing the driver element and screw element in normal position;

Figure 7 is a view similar to Figure 6 showing the driver element and screw element in operative position;

Figure 8 is an enlarged perspective view of the front portion of the power operated screwdriver, with parts thereof broken away for clarity of illustration; and Figure 9 is a rear end elevational view of the power operated screwdriver, with a portion thereof broken away for clarity of illustration.

Referring now to Figure 1 of the drawings, the power operated screw driver of this invention will be described. The screw driver includes a handle portion 10 provided with substantially upright portion 12 including a boss 13 and an upper arcuate support portion 14 which receives and supports a motor 16. Motor 16 is of the air operated type, and handle portion 10 includes an air inlet 18 and a trigger mechanism 20 controlling the valve arrangement which supplies air to the motor. An adjusting screw 22 is provided to adjust the timing of the valve arrangement. The air motor, the trigger mechanism, and the valve arrangement form no part of this invention and, therefore, no further description will be given. However, it should be noted that although the screw driver has been shown as air operated it may also be electrically or hydraulically operated if so desired.

A sleeve 24 extends outwardly from motor 14 and is secured thereto to provide a housing for a clutch mechanism shown schematically at 26. The clutch mechanism may be of a suitable type and known in the art. A bit holder 27 is secured to clutch portion 28 and includes a terminal housing portion 30 having a polygonally shaped bore to receive a similarly shaped end 32 of the driver element 34 in order to operatively secure the driver element to the bit holder and clutch arrangement.

A sleeve 36 has a bore 38 to provide a housing for the bit holder 27 and includes a base portion 40 secured to sleeve 24. The base portion of the sleeve is provided with a stepped bore 42 which provides a bearing for the clutch end of the bit holder and limits the outward movement thereof under the influence of gravity and the usual clutch opening mechanism. The normal position of the bit holder and clutch is shown in Figure 1. A sleeve 44 is slidably mounted within sleeve 36 by means of a bushing 46 which is fitted within a stepped portion of the bore 38 of sleeve 36. Sleeve 44 includes a bore 48 to provide a housing for the driver element 34 and is biased outwardly of sleeve 36 by a coil spring 50 having one end engaging the base portion 40 of sleeve 36 and the other end engaging the end of sleeve 44. In the normal position of sleeve 44, as shown in Figure 1, spring 50 biases the sleeve to its terminal outward position with respect to sleeve 36.

Referring now particularly to Figures 1 and 6, sleeve 44 includes an annular flange 54 and a substantially square shaped terminal portion 56. Portion 56 is provided with a stepped bore 58, 60, with bore portion 60 being of substantially the same diameter as driver element 34 in order to provide a supporting and guiding mechanism therefor. A nose piece 64 is provided with legs 66 which define a substantially square shaped opening. The legs engage a respective opposite flat side of terminal portion 56 and are secured thereto by a number of screws 68. The annular flange 54 of sleeve 44 locates the legs on terminal portions 56. The nose piece 64 is provided with a stepped bore 70, 72, with bore portion 70 having a diameter slightly larger than the diameter of the head of the particular screw element 74 within the bore, and bore portion 72 having a diameter larger than bore portion 70. Although bore portion 70 is shown as a circular bore, it may be polygonally shaped to receive similarly shaped heads of screw elements.

The sides of the nose piece 64 are slotted at 76, with portions 78 of the slots extending inwardly and opening into bore portion 70. A pin 80 spans the upper and lower walls of the respective slots and provides a pivotal support for a latch dog 82. Each of the latch dogs is provided with an intermediate slotted portion 84, as shown in Figure 4, and a coil spring 86 is wound around a respective pin 80 within the slotted portion of the latch dog. One end 88 of the spring engages the base 90 of slots 76 and the other end 92 of the spring engages the latch dogs, as shown in Figure 6, to bias the latch dogs inwardly with respect to the nose piece so that the latch dogs are in engagement with wall 94 of slot portions 78 and the terminal portions of the dogs define an opening 96 having a cross section less than that of the head of the screw element 74 but greater than the shank diameter thereof.

As previously mentioned, the power operated screw driver of this invention includes an improved manner of sighting for the operator to allow him to accurately position the screw driver with respect to the work piece so that the screw element to be driven will be aligned with the screw receiving recess in the work piece. Referring now particularly to Figure 6, a work piece 97 is shown schematically as including a pair of sheet metal plates provided with apertures 98 which define a screw receiving recess. In the operation of the tool, the operator places the nose piece 64 against the work piece over the screw receiving recess 98. If it were impossible for the operator to see the screw receiving recess once the nose piece of the tool had been placed against the work piece, then he would have to estimate the position of the nose piece with respect to the screw receiving recess in order to align the shank of the particular screw element 74 with the recess prior to driving the screw element.

By providing the slotted portions 78 which extend inwardly to bore portion 70 of the nose piece, the operator can see the screw receiving recess 98 even though the nose piece engages the work piece. Thus, the operator can accurately position bore portion 72 around the screw receiving recess so that the confines of the bore and of the screw receiving recess define concentric circles. When this is done, the axis of the screw element 74 will be in alignment with the center line of the screw receiving recess so that the screw element will be driven in place exactly as desired without cuting of the edges of the recess or bending thereof due to the shank of the screw element contacting the work piece around the recess.

If a screw element of the size shown in Figure 6 is used, the shank of the screw element will extend substantially across the openings of slotted portions 78 into bore portions 70 so that the operator can see the end of the screw element. This will also aid the operator in positioning the nose piece in the desired location with respect to the screw receiving recess, since he will be able to draw an imaginary line from the end of the screw element to the center line of the screw receiving recess. If the screw element is shorter than that shown in the drawings, then the opertaor may not be able to see the end of the screw element but he will still be able to accurately position the nose piece with respect to the screw receiving recess as previously set forth. Thus, this invention provides an improved manner of sighting for the operator which will allow him to exactly align the screw element with the screw receiving recess. This will prevent bending or cutting of the work piece around the screw receiving recess and may also prevent jamming of the screw element within the nose piece due to cocking of the screw element if it is not able to enter the screw receiving recess.

Referring now to Figures 1 through 5 of the drawings, a magazine track 100 has a forward arcuate portion 102 which includes a pair of spaced webs 104 which are welded or otherwise secured to the upper side 103 of terminal portion 56 to secure the track to sleeve 44. The track 100 is provided throughout its entire length with a groove 106 of substantially large width and a groove 108 of smaller width opening into the base of groove 106. Groove 106 terminates at its forward end in alignment with the cross portion of a T-shaped groove 107 in terminal portion 56 which opens to bore 70 to allow the screw elements to enter the bore from the track. The width of groove 106 is slightly larger than the diameter of the head of the screw elements 109 in the track in order that the screw elements may freely slide within the groove without binding but are prevented from becoming misaligned with respect to each other. A flat metal strip 110 is secured to each wall of the track at 111 to partially close the opening of groove 106 in order to prevent dislodgment or removal of the screws from within the groove. The flat metal strips 110 define a longitudinal opening having a width smaller than that of the diameter of the screw heads and slightly larger than the diameter of the screw shanks in order that the screws will be retained in groove 106 of the magazine track without binding between the shanks of the screws and the metal strips 110.

A bracket 112 has a lower split annular portion 114 encircling sleeve 36 and secured thereto in a position bearing against the forward end of sleeve 24 by screws 116 which extend through a respective leg of annular portion 114. The upper portion of bracket 112 terminates in a bifurcated portion 118, shown particularly in Figure 5, which slidably receives the track 100 to support an intermediate portion of the track and allow movement thereof relative to the bracket. A T-shaped bracket 120 has its upper laterally extending flange portions 122 welded or otherwise secured to the base of track 100 and its lower annular portion 124 provided with a bore which receives a circular bar 126 secured therein. The bar extends outwardly from bracket 120 and through a bore 128 provided in the upper portion 12 and boss 13 of handle portion 10, with a bushing 130 being provided between the bore and the bar. The end of the bar is slotted at 132 and a latch bar 134 is swingably mounted within the slot by means of pin 136. The forward portion of the latch bar terminates in upper and lower shoulder portions 138 and 140, respectively. A coil spring 142 mounted within a bore in the slot engages the base of the slot and the lower shoulder portion 140 of the latch bar to bias the bar upwardly or clockwise about pin 136 so that shoulder portion 140 of the latch bar will be positioned to engage the end surface of boss 13 and the latch bar will engage the base of slot 132 to prevent removal of spring 142.

Track 100, nose piece 64, and sleeve 44 are rigidly secured together and may be called a "magazine assembly." The assembly is slidably mounted on the remainder of the power screw driver by having sleeve 44 slidably mounted within sleeve 36 and track 100 slidably supported by bracket 112. Since spring 50 continually biases sleeve 44 outwardly of sleeve 36, it can be seen that the latch bar 134 limits the outward sliding movement of the assembly with respect to the remainder of the power screw driver and maintains some compression in spring 50 even when sleeve 44 is in its terminal outward position as shown in Figure 1. Spring 142 continually biases the latch bar 134 upwardly so that shoulder 140 is always in position to engage the end surface of boss 13 to prevent removal of the magazine assembly. However, if it is desired to remove this assembly by sliding sleeve 44 out of sleeve 36, the operator merely lifts the end of the latch bar upwardly to pivot the bar counterclockwise about pin 136 so that it is positioned within slot 132. Sleeve 44 can then be manually moved out of sleeve 36 with the aid of spring 50 to remove the magazine assembly from the remainder of the power screw driver.

As previously stated, the magazine assembly of this screw driver positively and successively feeds screw elements into position in alignment with the end of the driver element and holds the screw elements in this position to be operatively engaged by the driver element regardless of the position of the screw driver. Referring now particularly to Figures 1 through 5, this positive feeding feature of the magazine assembly will be described. A circular plate 150 has welded thereto a plate 152 which is secured to one side of the track 100 at 154 in order to position plate 150 below the track.

A hollow reel 156 is provided with a shaft 158 which extends through a bushing 160 and aperture 162 in plate 150 in order to pivotally mount the reel on the plate. Shaft 158 is retained in place by a retaining ring 163. As shown in Figure 5, a spiral spring 166 has one end 168 secured to the inner surface of the reel and the other end 170 secured to bushing 160 which is welded to plate 150 at 172. The coil spring biases the reel in a counterclockwise direction as viewed in Figure 1. Plate 150 includes an extending ear portion 174 which mounts a pin 176 to provide a pivotal support for a small roller 178. A similar roller 180 is pivotally mounted on a pin 182 which extends between the web portions 104 of track 100. A nylon or other cord 184 is wound around the reel, extends over pulley 178 and under pulley 180 and is then positioned within the small groove 108 which opens into the base of groove 106 as previously described. The free end of the cord extends through a bore of foot 186 and is knotted at 187 to operatively secure the cord to the foot.

Foot 186 is part of a guide assembly slidably mounted on track 100 and has a width substantially equal to the width of slot 106. The terminal portion of the foot is provided with an arcuate cut out portion 188 which engages the head of the terminal screw element 109' in the track as shown particularly in Figure 2. Since reel 156 constantly tends to wind up the cord 184 under the influence of spring 166, the engagement of foot 186 with the terminal screw element 109' biases the heads of each of the screw elements in the track into engagement with each other and biases the head of the next successive screw element 109" to screw element 74 into engagement with the head of screw element 74 to retain the screw element in engagement with the latch dogs 82 and in engagement with a portion of the surface of bore 70. Since the particular screw element 74 within bore 70 is thus held against the latch dogs and against a portion of the surface of bore 70, return of this screw element to the magazine is prevented regardless of the position of the tool, whether the nose of the tool extends upwardly or downwardly or the tool is placed in any horizontal position.

Thus, the positively wound reel 156 together with cord 184 and foot 186 positively bias all of the screw elements 109 in the track 100 into engagement with each other and hold the next successive screw element 109" in engagement with screw element 74 within bore 70. This allows the power screw driver of this invention to be used in any position. It will be noted that each of the screws 109 in the track can be successively driven into the work piece down to and including the terminal screw 109'. When the terminal screw is finally positioned within bore 70 in engagement with a portion of the surface of the bore and the latch dogs 82, the arcuate cut out portion 188 of foot 186 will engage the head of the screw to retain the screw in position. Since the width of foot 186 is larger than the width of the opening 107 of bore 70, the foot can engage the head of the screw without danger of the foot entering into the bore after the terminal screw element 109' has been driven into the work piece and the power screw driver is returned to its normal position preparatory to entry of the next successive screw element into bore 70.

Referring now particularly to Figure 4 it will be noted that the magazine assembly need not remain in vertical alignment with the remainder of the power screw driver unless so desired. If the operating conditions prevent engagement of the nose piece 64 with the work piece due interference with the magazine assembly, the magazine assembly can be moved to a number of positions with respect to the remainder of the power screw driver, two of these positions being shown schematically at A and B in Figure 4. Since the sleeve 44 is rotatably mounted within sleeve 36 as well as slidable therein, the operator merely grasps track 100 after slightly loosening screws 116 to move the magazine assembly and bracket 112 to various positions with respect to the remainder of the power screw driver. This feature of the power screw driver of this invention greatly adds to the usefulness of the tool under various operating conditions.

Since the base of foot 186 has a substantial length and covers the terminal portion of cord 184 in groove 108 as it moves along, the cord is effectively retained within the groove out of engagement with the heads of screw elements 109. This prevents wear of the cord by the heads of the screw elements and tangling of the cord with the screw elements to assure that the full force of spring 166 on the reel will be transmitted to the foot by the cord. In order that the foot 186 may be manually moved out of groove 106 to fill the groove with screws after the supply within the groove has been exhausted, a handle 192 is secured to a substantially upright portion 194 of the foot. Portion 194 extends between the bifurcated legs 196 of handle 192 and is secured thereto at 198. A roller 200 is also supported within the bifurcated legs 196 of the handle by means of a pin 202. The roller engages the base of groove 106 and either side of groove 108 as shown in Figure 1 and supports the handle in a substantially horizontal position so that there is no tendency for the foot to shift upwardly out of engagement with the terminal screw element 109'. Thus, each of the screw elements within the track is continually held in engagement with the next successive screw element in the track and the next successive screw element 109" to the particular screw element 74 within bore 70 is held in engagement with the particular screw element within the bore.

Referring now to Figures 1, 6, and 7, the operation of the power screw driver will be described. Figures 1 and 6 show the normal position of the screw driver with clutch 26 disengaged; driver element 34 out of engagement with the particular screw element 74 within bore 70; sleeve 44 biased to its extreme outward position with respect to sleeve 36 under the influence of spring 50; and the next successive screw element 109' in engagement with the particular screw element 74 within bore 70 to hold the particular screw element against the latch dogs 82 and against a portion of the surface of bore 70 to retain the particular screw element in position. When it is desired to drive screw element 74 into the screw receiving recess 98 in the work piece 97, nose piece 64 is positioned against the work piece as shown in Figure 6 and the operator of the screw driver positions the tool by means of the sight openings 78 as previously described. After nose piece 64 has been accurately aligned with the work piece, the operator presses against handle portion 10 to shift the magazine assembly with respect to the remainder of the power screw driver. This causes sleeve 44 to slide inwardly within sleeve 36 against the action of spring 50 as track 100 slides relative to bracket 112 and bar 126 slides in bore 130 of the handle portion 12.

Movement of sleeve 44 within sleeve 36 brings the head of screw element 74 into engagement with the driver element 34. After this engagement, the operator continues to press against handle portion 10 to move sleeve 44 further inwardly within sleeve 36 to cause engagement of the clutch arrangement 26 and to cause the driver element 34 to move screw element 74 past the latch dogs 82, which swing outwardly of the nose piece to allow passage of the screw head as shown in Figure 7. The operator then presses the trigger mechanism 20 to actuate the air motor 16 to drive the screw element 74 into the work piece.

As previously mentioned, the next successive screw element 109' in the track 100 is always in engagement with the screw element 74 within bore 70. As the driver element 34 moves screw element 74 past the latch dogs 82, the driver element is positioned over the opening of track 100 into bore 70 to prevent entry of the next successive screw element 109' into the bore. However, this screw element is held in engagement with the driver element 34 by the cord and reel mechanism.

After screw element 74 is driven into the work piece, the operator releases the pressure on handle 10 to allow spring 50 to return the magazine assembly to its initial starting position. As the driver element is withdrawn from its position of Figure 7 to its position of Figure 6, past the opening 107 of track 100 into bore 70 the next successive screw element 109' will automatically drop into place behind the latch dogs 82 and will be held in this position by the next successive screw element in the track in the same manner as screw element 74 was held in engagement with the latch dogs and a portion of bore 70. Thus, the screw driver is again automatically readied for operation to drive a screw element into a work piece.

Although the screw element shown is of the Phillips head type and the driver element 34 has a driver portion adapted to fit within a Phillips head type screw, it is obvious that other screw heads and other driver elements may be used.

Although a specific embodiment of this invention has been shown and described, various changes and modifications may be made within the scope and spirit of the invention.

I claim:

1. In a power operated tool, the combination comprising, a housing having a driver element therein, slide means supported by said housing for sliding movement relative thereto and adapted to receive said driver upon sliding movement thereof, a magazine supported on said slide means and normally adapted to discharge work elements into said slide means in spaced relationship with said driver element, latch means engageable with the particular work element within said slide means to prevent release of said work element outwardly thereof, positive biasing means engaging said work element to hold said element in engagement with said latch means to thereby locate said element within said slide means and prevent return thereof to said magazine regardless of the position of said tool, and means for moving said slide means to cause engagement of said driver element with said work element to drive said work element out of engagement with said latch means and said positive biasing means.

2. In a power operated tool, the combination comprising, a housing having a driver element therein, slide means supported by said housing for sliding movement relative thereto and adapted to receive said driver upon sliding movement thereof, a magazine secured to said slide means and having an opening into said slide means normally positioned in spaced relationship to said driver element for discharging work elements to said slide means, latch means engageable with the particular work element within said slide means to prevent release of said work element outwardly thereof, positive biasing means engaging the next successive work element in said magazine to hold said successive work element in engagement with said particular work element and thereby hold said particular work element in engagement with said latch means to thereby locate said particular element within said slide means and prevent return thereof to said magazine regardless of the position of said tool, and means for moving said slide means to cause engagement of said driver element with said particular work element to drive said particular work element out of engagement with said latch means and said next successive work element.

3. In a power operated tool, the combination comprising, a housing having a driver element therein, slide means supported by said housing for sliding movement relative thereto and adapted to receive said driver upon sliding movement thereof, a magazine supported on said slide means and having an opening into said slide means normally positioned in spaced relationship to said driver element for discharging work elements to said slide means, latch means engageable with the particular work element within said slide means to prevent release of said work element outwardly thereof, positive biasing means in said magazine engaging the next successive work element to hold said element in engagement with said particular work element whereby said particular work element is held in engagement with said latch means to thereby locate said particular work element within said slide means and prevent the return thereof to said magazine regardless of he position of said tool, and means for moving said slide means with respect to said housing to cause engagement of said driver element with said particular work element to drive said work element out of engagement with said latch means and said next successive work element and position said driver element over the opening of said magazine to prevent entry into said slide means of said next successive work element.

4. In a power operated tool, the combination comprising, a housing having a driver element therein, slide means supported by said housing for sliding movement relative thereto and having a bore therethrough to receive said driver upon sliding movement thereof, a magazine supported on said slide means and normally adapted to discharge work elements into said bore in spaced relationship with said driver element, latch means engageable with the particular work element within said bore to prevent release thereof out of said bore, positive biasing means engaging said work element to hold said element in engagement with said latch means and prevent return thereof to said magazine regardless of the position of said tool, means for moving said slide means to cause engagement of said driver element with said work element to drive said work element out of engagement with said latch means and said positive biasing means, and sight means on said slide means opening to the exterior thereof to allow the tool operator to observe the area of the work piece within said bore to accurately position said slide means in position against said work piece.

5. In a power operated tool, the combination comprising, a housing having a driver element therein, slide means supported by said housing for sliding movement relative thereto and having a bore therethrough to receive said driver upon sliding movement thereof, said slide means being adapted to engage a work piece with the opening of said bore positioned thereon in the desired location, sight means including outwardly opening grooves in said slide means to enable the tool operator to observe the area of the work piece defined by said bore, a magazine supported on said slide means and normally adapted to discharge work elements into said slide means in spaced relationship with said driver element, latch means positioned within the opening of said sight means for engaging the particular work element within said bore to prevent release thereof, positive biasing means engaging said work element to hold said element in engagement with said latch means and prevent return thereof to said magazine regardless of the position of said tool, and means for moving said slide means to cause engagement of said driver element with said work element to drive said work element out of engagement with said latch means and said positive biasing means.

6. In a power operated tool the combination comprising, a housing having a driver element therein, slide means supported by said housing for sliding movement relative thereto and having a bore therethrough to receive said driver upon sliding movement thereof, said slide means being adapted to engage a work piece with the opening of said bore positioned thereon in the desired location, sight means including outwardly opening grooves in said slide means to enable the tool operator to observe the area of the work piece defined by said bore, a magazine supported on said slide and normally adapted to discharge headed work elements into said slide means in spaced relationship with said driver element, latch means on said slide means for engaging the undersurface of the head of the particular work element within said bore to prevent release thereof, positive biasing means engaging the head of said particular work element to hold said element in engagement with said latch means and prevent return thereof to said magazine regardless of the position of said tool, and means for moving said slide means to cause engagement of said driver element with said work element to drive said work element out of engagement with said latch means and said positive biasing means.

7. In a power operated tool, the combination comprising, a housing having a driver element therein, slide means supported by said housing for sliding movement relative thereto and having a bore therethrough to receive said driver upon sliding movement thereof, a magazine secured to said slide means and having an opening normally positioned in spaced relationship to said driver for discharging headed work elements into said bore with the axis of said elements being substantially in alignment with the axis of said bore, latch means on said slide means engaging the undersurface of the head of the particular work element within said bore to position said work element with the shank thereof projecting outwardly with respect to said bore, positive biasing means on said magazine engaging the head of said work element to to hold the undersurface of the head of said element in engagement with said latch means and the side of the head of said element in engagement with said bore to thereby prevent return of said element to said magazine regardless of the position of said tool, and means for moving said slide means to cause engagement of said driver element with the head of said work element to drive said work element out of engagement with said latch means and said positive biasing means.

8. In a power operated tool, the combination comprising, a housing, a driver element within said housing, slide means supported by said housing for sliding movement relative thereto and having a bore therethrough to receive said driver upon sliding movement thereof, a magazine supported on said slide means for reciprocation therewith and containing a plurality of successively engaged work elements, said magazine having an opening normally positioned in spaced relationship to said driver for discharging said elements into said bore, latch means on said slide means engaging the particular work element within said bore to prevent release thereof, positive biasing means on said magazine engaging the terminal work element to hold said elements in engagement with each other and with said particular work element within said bore, and means for moving said slide means in opposite directions with respect to said housing, movement of said slide means in one direction causing engagement of said driver with said particular work element to drive said element past said latch means and position said driver over the opening of said magazine to prevent entry of the next successive work element into said bore, movement of said slide means in an opposite direction moving the opening of said magazine to said normal position in spaced relationship to said driver whereby said positive biasing means discharges the next successive screw element into said bore into engagement with said latch means.

References Cited in the file of this patent

UNITED STATES PATENTS

| 1,945,741 | Gray | Feb. 6, 1934 |
| 2,374,558 | Moore | Apr. 24, 1945 |
| 2,517,113 | Jones | Aug. 1, 1950 |
| 2,534,140 | Moore | Dec. 12, 1950 |
| 2,544,165 | Krasnow | Mar. 6, 1951 |
| 2,607,252 | Shaff | Aug. 19, 1952 |
| 2,657,721 | Shaff | Nov. 3, 1953 |
| 2,689,589 | Allen et al. | Sept. 21, 1954 |
| 2,670,770 | Potterton | Mar. 2, 1954 |
| 2,770,269 | Austin | Nov. 13, 1956 |

FOREIGN PATENTS

| 704,991 | Great Britain | Mar. 3, 1954 |